United States Patent Office 3,268,059
Patented August 23, 1966

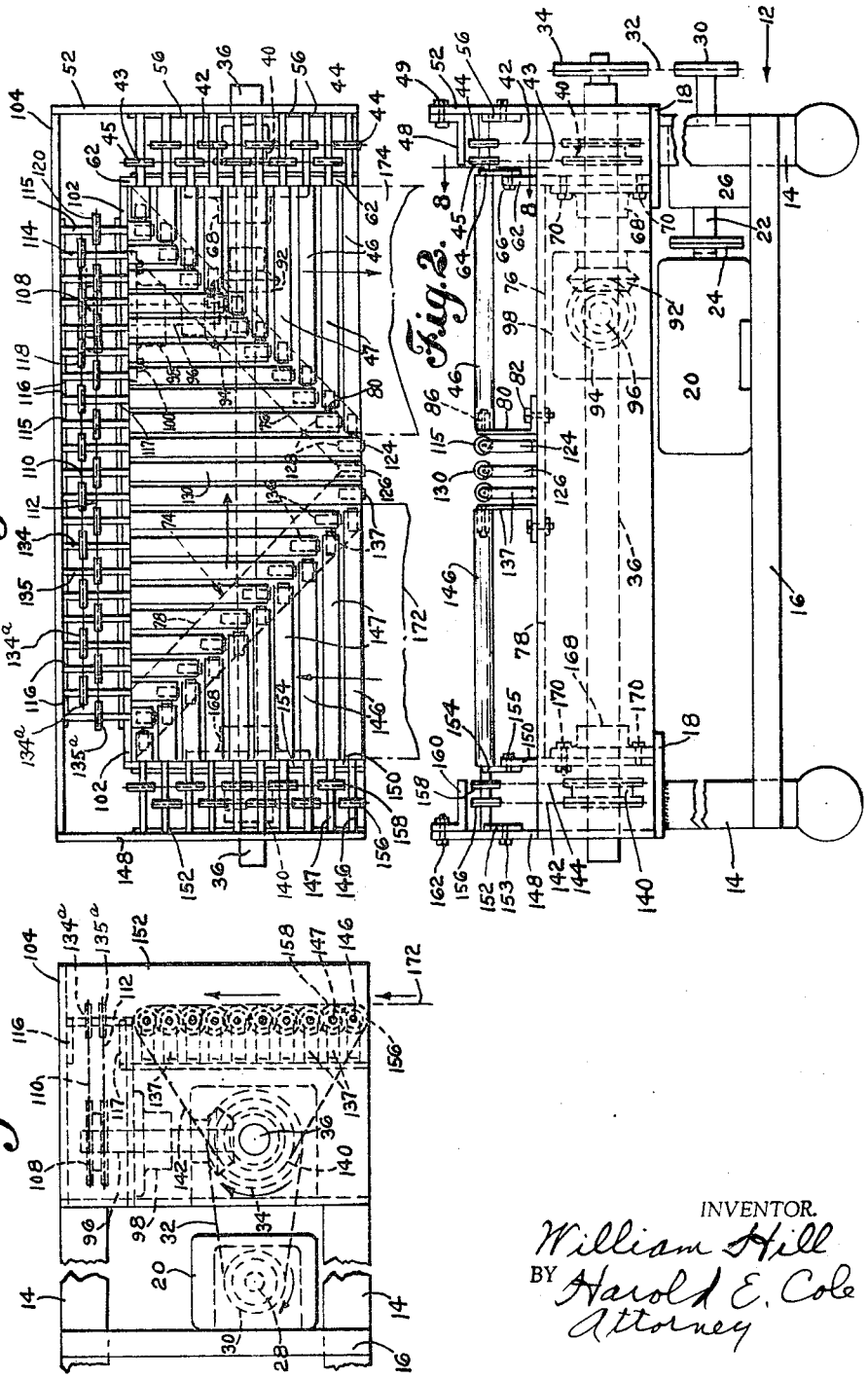

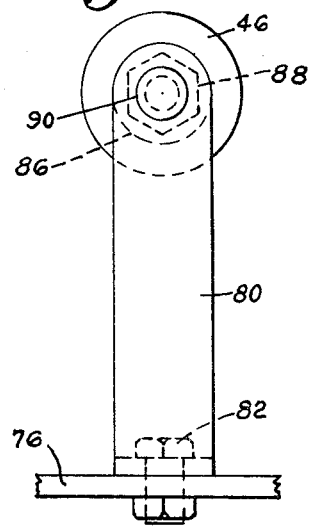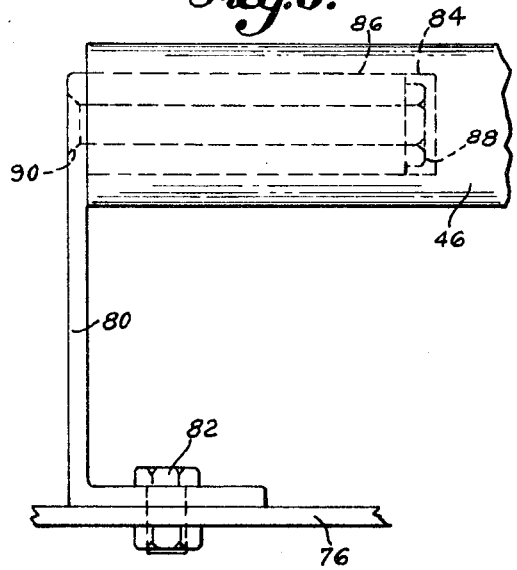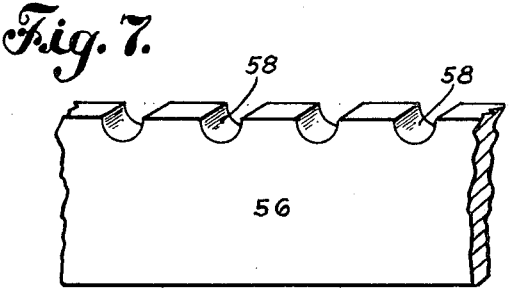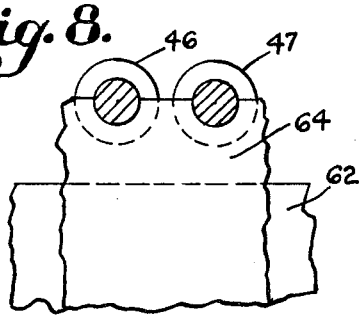

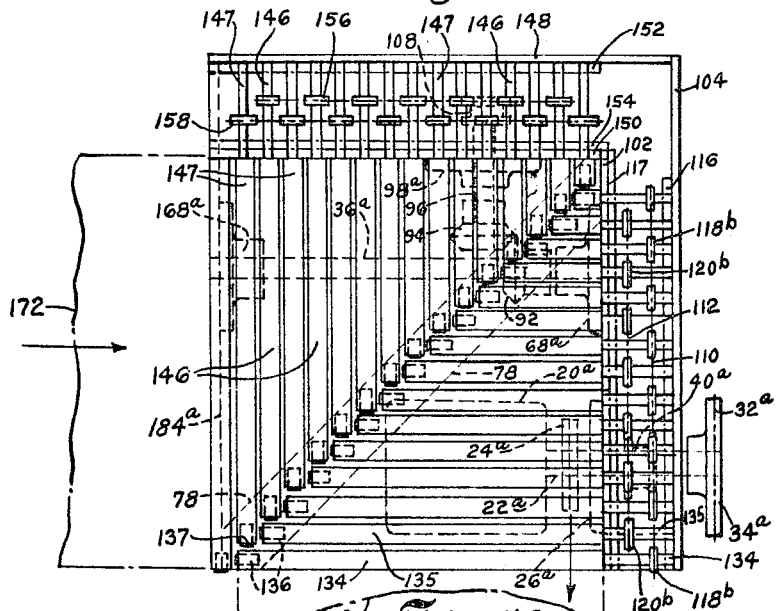
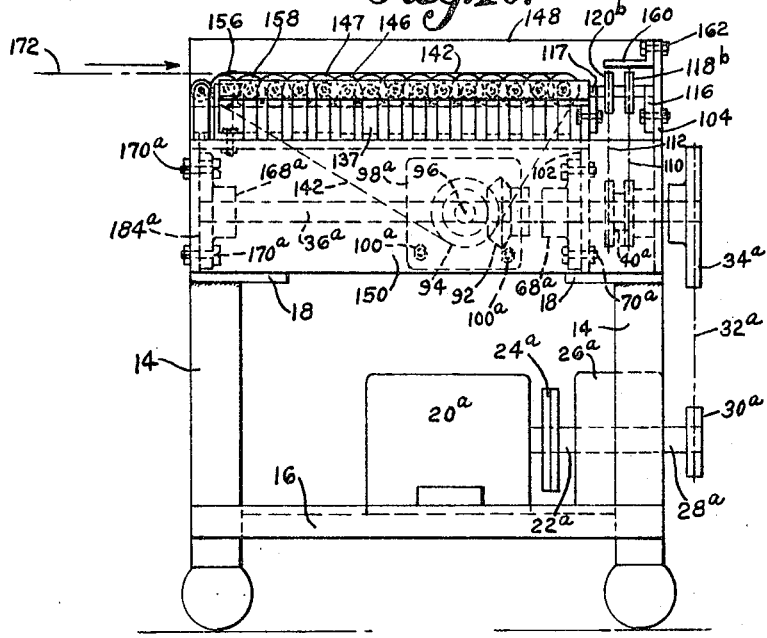

3,268,059
CONVEYOR APPARATUS
William Hill, 75 Taylor Road, Belmont, Mass.
Filed Nov. 17, 1964, Ser. No. 411,744
7 Claims. (Cl. 198—127)

This invention relates to apparatus to convey articles.

One object of my invention is to provide such apparatus that will automatically convey articles from one set of rolls angularly to another set, and if desirable to convey them angularly from the latter to still another set.

Another object is to accomplish the foregoing with the use of rotating conveyor rolls in sets that are adjacent each other and which pass the articles conveyed from one set of rolls to the other in a smooth, continuous movement.

Still another object is to so provide a construction that requires a minimum amount of space and such that the movement of the actuating parts is progressive and direct.

A further object is to provide apparatus that is simple in operation, formed of parts that are easy to assemble, and which can be operated economically.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

In the drawings:

FIG. 1 is a top plan view of my apparatus, showing three sets of conveyor rolls; but omitting the hold-down guides for sprocket chains.

FIG. 2 is a front elevational view of said apparatus, including said hold-down guides.

FIG. 3 is a left side elevational view of said apparatus.

FIG. 4 is an enlarged, front elevational view of a conveyor roll for my apparatus and supporting means thereof.

FIG. 5 is a fragmentary, side elevational view of the conveyor roll and supporting means shown in said FIG. 4.

FIG. 6 is an elevational view of a conveyor roll.

FIG. 7 is a fragmentary, perspective view of a bearing for said conveyor rolls.

FIG. 8 is an enlarged, fragmentary sectional view taken on the lines 8—8 of FIG. 2.

FIG. 9 is a top plan view on a larger scale, of a modified form of my apparatus, omitting the hold-down guides.

FIG. 10 is a side elevational view of the apparatus shown in said FIG. 9; but including the hold-down guides.

As illustrated, my conveyor apparatus has a support 12 formed with posts 14, lower cross members 16 and upper cross plate supports or shelves 18 which are attached to said posts. A motor 20 is supported by said lower cross members 16. Said motor has a shaft 22 to which a coupling 24 is connected, and connected to the latter is a gear box 26 from which a reduced gear box shaft 28 extends. A clock-wise, rotating sprocket 30 on the latter receives a drive chain 32 that runs over it and over a drive sprocket 34 that is mounted on a long shaft 36, later described, that is turned down where it extends into said sprocket 34.

A conveyor roll double-drive sprocket 40 is fixed on said shaft 36 and a double roller chain has two chains 42 and 43 that travel over this double sprocket 40 and rotate counter-clockwise. Two sprockets 44 and 45 are in staggered position relative to each other and chains 42 and 43 respectively run over them. Conveyor rolls 46 and 47 of varying lengths and spaced slightly apart are fixedly connected respectively to said sprockets 44 and 45. The number of conveyor rolls provided in a set depends upon the size of the conveyor apparatus desired. A hold-down guide 48 for said chains is bolted as at 49 to an outer frame 52 that is welded or otherwise attached to said cross plate supports 18. An elongate bearing 56 for said rolls 46 and 47 has recesses 58 in which said rolls set, and it is bolted as at 60 to said outer frame 52.

Spaced from said outer frame 52 is an inner frame 62 that is attached to one of said cross plate supports 18. An elongate bearing 64 for said rolls 46 and 47 is attached by bolts 66 to inner mount 62. A bearing 68 is attached to inner mount 62 by bolts 70 and supports said long shaft 36.

A V-shaped supporting mount or frame 74 has a diagonally extending right side 76 and a similar left side 78, which are joined, as by welding, at their meeting point. Said rolls 46 and 47 are supported by connectors or angle brackets 80 that are bolted as at 82 to said right side 76. Said rolls 46 and 47 have holes 84 at one end in which nylon bearings 86 rotatably extend. Studs 88 hold the latter to said angle brackets 80, being peened over as at 90.

A miter gear 92 is attached to said long shaft 36 at an intermediate point thereof and it meshes with another miter gear 94 that is fixed on a shaft 96 that extends angularly with relation to shaft 36 and which shaft 96 has a bearing 98. Bolts 100 attach said bearing 98 to an inner rear mount 102 that extends at an angle to said inner mount 62.

An outer rear frame 104 is spaced from said inner frame 102, being attached to said cross plate support 18 as by welding. A double sprocket 108 is mounted on said shaft 96 and a double roller chain has two chains 110 and 112 that run over it to thereby rotate conveyor rolls 114 and 115 respectively. A bearing 116 is attached to said outer frame 104 and another bearing 117 is attached to said inner frame 102. These bearings 116 and 117 support the reduced ends of said rolls 114 and 115 respectively. Sprockets 118 and 120 are fixed on said rolls 114 and 115 and are positioned in staggered relationship to each other.

Angle brackets 124 for said rolls 114 and 115 are attached to said frame right side 76. An angle bracket 126 is attached to said frame left and right diagonal sides 78 and 76 where they meet and join. Nylon bearings 128 rotatably extend into holes in said rolls 114 and 115, being held by studs, not shown, similar to those shown in said FIG. 5.

Conveyor rolls 134 and 135 of varying lengths are attached respectively to sprockets 134a and 135a and rotate therewith. They are received by nylon bearings 136 that are attached to angle brackets 137 in a manner previously described. A double sprocket 140 fixed on long shaft 36, and a double roller chain has two chains 142 and 144 running over said sprocket 140 which serve respectively to rotate conveyor rolls 146 and 147 clockwise.

An outer frame 148 is spaced from an inner frame 150 and both are attached to said cross plate support 18. Conveyor rolls 146 and 147 of varying lengths are supported by bearings 152 and 154 that are attached to said outer and inner frames 148 and 150 and these rolls extend angularly relative to said rolls 134 and 135. Bearings 152 and 154 are respectively attached to said frames 148 and 150 by bolts 153 and 155 respectively. Sprockets 156 and 158 are fixed on said rolls 146 and 147 respectively and are positioned in staggered relationship.

A guide 160 for said chains 142 and 144 is bolted as at 162 to said outer frame 148. A bearing 168 is bolted as at 170 to said inner frame 150 and it receives said long shaft 36.

Said conveyor rolls 146 and 147 commence at the front of my apparatus and extend laterally towards said rolls 134 and 135 that are shown at right angles thereto. These rolls 146 and 147 diminish or shorten progressively from the front of my apparatus to the rear.

Said conveyor rolls 134 and 135, and 114 and 115 extend from the front of my apparatus rearwardly and said rolls 134 and 135 diminish progressively in length in a direction towards said rolls 146 and 147, while said rolls 114 and 115 diminish likewise towards said rolls 46 and 47.

Said conveyor rolls 46 and 47 commence at the front of my apparatus and are spaced laterally from said conveyor rolls 146 and 147, and are also substantially parallel therewith. They diminish in length progressively from the front of my apparatus to the rear.

Said rolls may be of varying sizes, depending upon the articles to be conveyed.

Each group of the conveyor rolls, as shown, is so formed and positioned as to form substantially a triangle.

At the front of my apparatus I show, broken away, the usual conveyor belt 172 that deliver articles to said rolls 146 and 147. In front of said rolls 46 and 47 is a similar bolt 174 to take the conveyed articles away.

In operation of my conveyor apparatus said rolls 146 and 147 may serve as the initial receiving rolls for articles to be conveyed and rotate in a clockwise direction. Said rolls 134 and 135 will receive the articles from said rolls 146 and 147 and they and rolls 114 and 115 rotate in a clockwise direction and preferably slightly faster than rolls 146 and 147. Said rolls 46 and 47 will receive articles from said rolls 114 and 115 and rotate in a counter-clockwise direction, hence the articles will pass off the latter and onto a receiving table or conveyor or into a receptacle.

In FIGS. 9 and 10 I show my conveyor apparatus with two sets of rolls, omitting the rolls 130, 114, 115, 46 and 47, which are not included in this apparatus. In this event the articles conveyed will pass from said rolls 146 and 147 to rolls 134 and 135, and thence carried away by a conveyor 182a. In this arrangement a motor 20a is below said rolls 134 and 135. A motor shaft 22a extends therefrom to a coupling 24a and to the latter a gear box 26a is connected from which a gear box shaft 28a extends. A sprocket 30a on the latter receives a drive chain 32a that runs over it and over a drive sprocket 34a that is mounted on a long shaft 36a. A double sprocket 40a is fixed on said latter shaft.

The other parts of this modified apparatus are the same as shown in said FIGS. 1 and 2, and are given the same numerals, except that a bearing 68a is bolted as at 70a to inner rear frame 102, and a bearing 98a is bolted as at 100a to said inner frame 150, and a bearing 168a is bolted as at 170a to a frame 184a that is fixed to said cross plate 18.

What I claim is:

1. Conveyor apparatus comprising a plurality of first conveyor rolls, means to rotate said rolls, a plurality of second conveyor rolls extending angularly from and commencing adjacent said first rolls, means to rotate said second rolls, said first rolls diminishing in length from front to rear thereof in a direction towards said second rolls, the latter rolls diminishing in length from the outer one in a direction towards said first rolls, and supporting means for said first and second conveyor rolls and for said means to rotate said rolls.

2. Conveyor apparatus as set forth in claim 1, said first conveyor rolls extending laterally and substantially parallel with the front of said apparatus.

3. Conveyor apparatus as set forth in claim 1, said supporting means embodying a diagonally extending frame member supporting ends of said first rolls and ends of said second rolls, and embodying a first frame adjacent other ends of said first rolls and supporting the latter, and another frame adjacent other ends of said second rolls and extending angularly relative to said first frame and supporting said ends of said second rolls.

4. Conveyor apparatus as set forth in claim 1, said supporting means embodying a first frame at one side extending from front to rear, said first rolls extending from said first frame at one of their ends and in varying lengths and terminating at different rearwardly extending points at their opposite ends, and embodying a second frame extending angularly from said first frame from front to rear and parallel with said first rolls, said second rolls extending from said second frame at one of their ends in varying lengths and terminating at different rearwardly extending points at their opposite ends.

5. Conveyor apparatus as set forth in claim 1, and a plurality of third conveyor rolls of varying lengths, extending angularly from and commencing adjacent said second rolls, said means to rotate said rolls embodying a shaft extending from one side of said apparatus to the other side and operably connected to said first and third rolls, miter gears operably connected to said shaft, and another shaft connected to and extending angularly from the latter, and operably connected to said second rolls.

6. Conveyor apparatus comprising a plurality of first conveyor rolls, means to rotate said rolls, a plurality of second conveyor rolls extending angularly from and some of which commence adjacent said first rolls, means to rotate said second rolls, a plurality of third conveyor rolls extending angularly from and some of which commence adjacent said second rolls, means to rotate said third rolls, said first and third rolls diminishing in length from front to rear thereof in a direction towards said second rolls, some of said latter rolls diminishing in length from an outer one in a direction towards said first rolls, and other of said latter rolls diminishing in length from an outer one in a direction towards said third rolls, and supporting means for said conveyor rolls and said means.

7. Conveyor apparatus as set forth in claim 6, and a single shaft extending between opposite sides of said apparatus and operably connected to said first rolls and to said third rolls.

References Cited by the Examiner
UNITED STATES PATENTS

| | | | |
|---|---|---|---|
| 1,479,866 | 1/1924 | Moores | 198—190 |
| 1,931,453 | 10/1933 | Adams | 198—127 |

EVON C. BLUNK, *Primary Examiner.*

RICHARD E. AEGERTER, *Examiner.*